3,283,059
COMBINED CABLE SPLICE RACK AND
PROTECTOR THEREFOR
Walter A. Plummer, 3546 Crownridge Drive,
Sherman Oaks, Calif.
Filed June 4, 1965, Ser. No. 461,481
2 Claims. (Cl. 174—38)

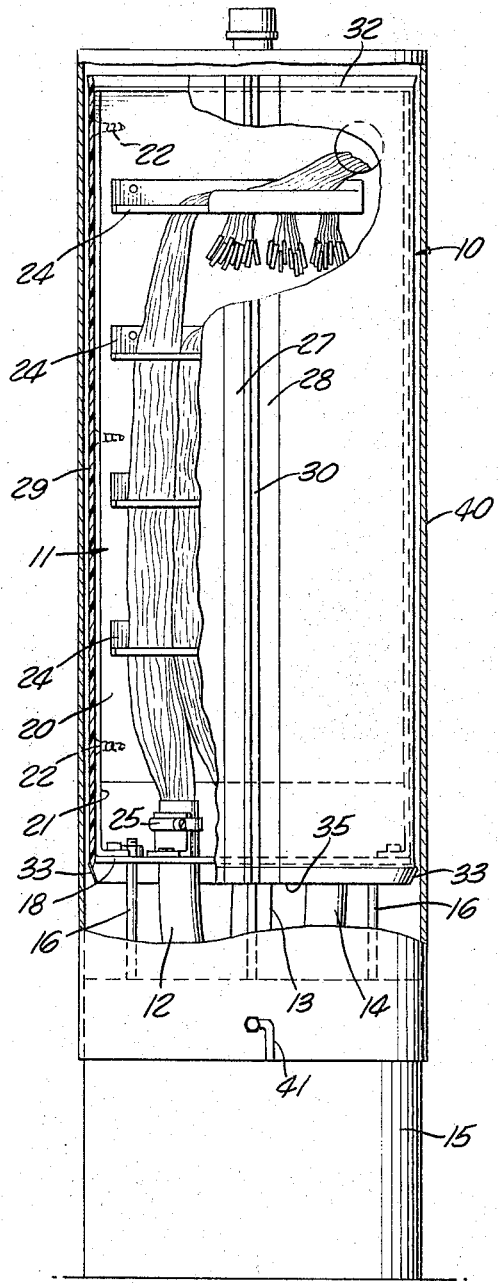
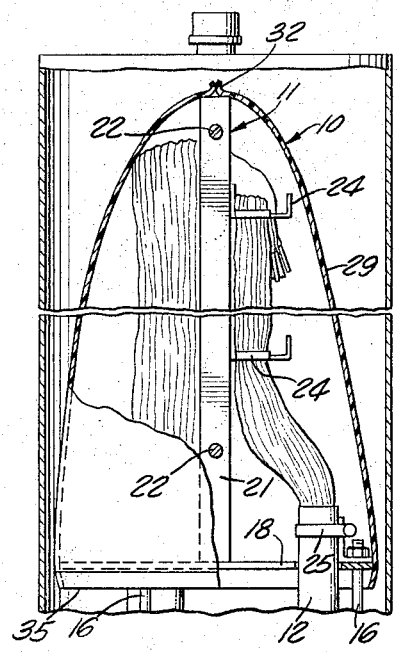
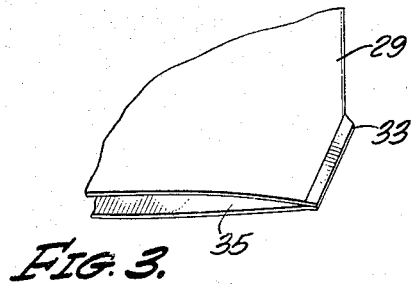
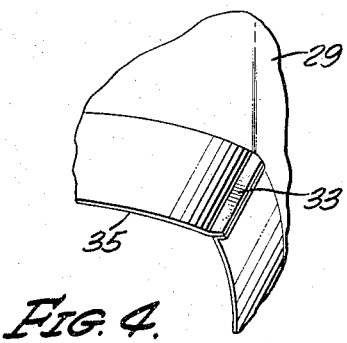
Fig. 1.
Fig. 2.
Fig. 3.
Fig. 4.
INVENTOR.
WALTER A. PLUMMER United States Patent Office 3,283,059
Patented Nov. 1, 1966

This invention relates to cable splice pedestals and racks and more particularly to a protective boot and cover designed for expeditious assembly and removal with respect to such racks.

Certain communication cable installations make use of vertically arranged racks for supporting splices between cables entering the rack from below. These racks involve a rigid support to which the cable ends are anchored and have facilities for fanning out and supporting the exposed wire ends to facilitate splicing and identification of the conductors. When the splice is not being worked upon it is customary to enclose it within a protective cover. However, it has been found that the cover constructions heretofore provided for this purpose are subject to certain disadvantages and that there is a need for a primary protector of an inexpensive moisture-proof nature and which can be easily applied over the rack and removed therefrom in lieu of the main cover between splicing operations, and serving additionally as a permanent part of the protective cover facilities for the splice along with the outer rigid cover.

Accordingly there is provided by this invention a protective boot or cover for a vertically arranged cable splice rack. This cover comprises an elongated tubular body closed at its upper end and provided with a restricted end adapted to snugly embrace the base ring commonly present in splice rack assemblies. Assembly of the cover over the rack and its removal therefrom is facilitated by the provision of a readily opened fluid-tight seam extending lengthwise of the protector. When this seam is opened the restricted open end of the protector is readily engaged over or disengaged from the rack base ring member. So long as the protector is in place the splice components are fully protected from dust, foreign matter, moisture and the like. Accordingly the protector can be used alone over extended periods to protect the splice; and once the splicing operations have been completed the protector provides added protection and avoids any possibility of any splice components becoming shorted by contact with the rigid outer housing.

Accordingly it is a primary object of the present invention to provide an inexpensive easily-applied and easily-removed protective cover for vertically arranged cable splices and the supporting rack therefor.

Another object of the invention is the provision of an article of manufacture comprising a simple, lightweight, protective cover having readily opened and reclosed seam means facilitating assembly and disassembly of the cover over a cable splice rack and additionally functioning when closed to hold the protector in assembled position.

These and other more specific objects will appear upon reading the following specification and claims and upon considering in connection therewith the attached drawings to which they relate.

Referring now to the drawings in which a preferred embodiment of the invention is illustrated.

FIGURE 1 is a vertical elevational view with parts broken away showing a preferred embodiment of the invention in its normal operation position;

FIGURE 2 is a view similar to FIGURE 1 but taken at right angles thereto and showing the protector broken away;

FIGURE 3 is a fragmentary view on an enlarged scale through one lower corner of the protector; and FIGURE 4 is a perspective view generally similar to FIGURE 3 but showing the protector inlet expanded.

Referring to the drawings there is shown a preferred embodiment of the invention fully installed in a typical operating environment. The protective cover proper, designated 10, is shown installed over a vertically arranged cable splice rack designated generally 11. It will be understood that the cables 12, 13, 14 to be spliced project upwardly into the rack from below, as through a hollow tubular support 15. The rack proper is usually supported from the upper end of tube 15, as by stud bolts 16, 16 anchored to the latter. The rack includes a base ring 18 anchored to the upper ends of bolts 16. The main body of the rack includes a panel board 20 extending diametrically across tubular support 15 and anchored to base ring 18 through brackets 21 and screws 22. The opposite faces of this panel board are provided with a series of angle shaped bracket members, the horizontal flanges of which are formed with openings through which the fanned-out terminal wires of the cables are distributed. The sheath of cables 12, 13 and 14 are firmly anchored to base ring 18 by suitable clamps 25 each having a bracket secured to the base ring.

Splice protector 10 is preferably formed from thin, supple, impervious sheet material having excellent dielectric characteristics, any one of numerous thermoplastic compositions being eminently satisfactory. A single sheet 29 of material suffices and avoids the need for additional seams. The opposite lateral edges of this main body sheet are each provided with one of a pair of seam forming tapes 27, 28. These tapes are preferably formed from thermoplastic material and are heat-fused or otherwise secured to the main body sheet. Each tape is provided along its free edge with any suitable and well known form of interlocking tongue and groove seam structure 30. A particularly suitable type of seam is that shown in my United States Patent 3,089,915 granted May 14, 1963. However, it is to be understood that any of numerous forms of interlocking seam forming constructions can be employed in practicing this invention. Desirably the seam extends the full length of the protector body.

After the seam tapes have been applied to the main body they are preferably closed and the resulting tube is flattened. One end is sealed closed, as by applying heat to a narrow strip extending across the end to heat fuse the plastic sheets together at 32, it being noted that this fused joint extends across the closed seam tapers 27, 28.

In addition the flattened protector is also sealed diagonally of the corners at its open end, as is indicated at 33, to provide the protector with a restricted open end 35. After the diagonal seam 33 has been formed the excess material is trimmed away in the interest of neater appearance. Preferably at least two or more diagonal seams 33 should be provided in order that the inlet proper will be of appreciably smaller diameter than that of base ring 18 of the rack structure. When the protector is expanded from the flattened condition shown in FIGURE 3, the inlet will have a converging and restricted inlet of the shape shown in FIGURE 4. From the foregoing it will be recognized that the diagonal seams 33, 33 serve to form an inlet opening 35 which is considerably smaller than the main body of the protector.

Protector 10 is assembled over the cable splice rack by opening seam 30 substantially throughout its length and wrapping the protector about the rack with seam 32 at the upper end of the protector overlying and supported by the upper end of rack panel 20. The restrictive lower end of the protector is then drawn about the base ring and seam 30 is closed from its upper end downwardly across its lower end. This closing operation may be accomplished simply by pressing the tongues and grooves of the two seam forming tapes 27, 28 together progressively from the upper end to the lower end 30. Or for greater convenience, this seam is provided with the usual slider type closure device, not shown, but customarily present and serving to greatly speed opening and closing of the seam. When the seam is closed the restricted lower end is drawn taut about the rim of base ring 18 and cannot be withdrawn unless and until seam 30 is opened. After the protector is in place and closed the rack assembly may be further protected by a rigid outer housing 40. This housing is telescoped over the upper end of the rack and the bayonet type coupling 41 located at its lower end carried in part by base tube 15 and serves to lock the housing in assembled position. It is pointed out that during intervals between actual splicing operations it is customary to leave housing 40 off the rack and to rely entirely upon protector 10 to enclose and protect the splice components until the serviceman is again ready to work upon the splice. Protector 10 is strong, waterproof and highly reliable in protecting the splice against the weather even in fully exposed outdoor locations. It will also be recognized that the protector is quickly removed and reassembled without need for clamps or tools.

While the particular protector for cable splice rack herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. In combination, a cable splice rack of the type having a vertically disposed rack provided with means to support cable splices between cables entering and exiting from the lower end of said rack and including a base ring encircling the lower end of said rack, that improvement which comprises: a protective waterproof splice protector enclosing said rack and base ring, said splice protector having an elongated main body formed from a single piece of supple flexible sheet plastic material and provided along the full length of its opposed longer lateral edges with a pair of complementally-shaped seam-forming tapes of supple plastic material constructed for separable interlocking engagement with one another to form a fluid-tight seam, the top end of said main body being permanently sealed closed across the full width thereof and across the adjacent interlocked portion of said seam-forming tapes, and the diametrically opposed corner portions at the lower end of said main body being permanently sealed together along diagonal lines converging toward one another and away from the fully closed top end of said main body, said diagonal lines lying in the same general plane as the sealed top end of said splice protector to facilitate the flat compact packaging and storage of said protector when not in use, and said diagonal seals across the lower corners of the open end of said protector providing a slightly restricted open end spaced below and having a girth appreciably less than the girth of said base ring whereby said diagonally sealed corners cooperate with said base ring to lock the protector in assembled position on said cable splice rack so long as said separable seam remains closed and whereby said splice protector is readily released for withdrawal from said splice rack upon opening said seam from the lower end thereof.

2. In combination with a vertically disposed cable splice rack having a generally circular base ring encircling its lower end, that improvement which comprises a moisture-proof protector adapted to be assembled about and to be removed from said cable splice rack from one side thereof, said protector being formed entirely in one unitary piece from thin flexible sheet plastic material having excellent dielectric properties, said protector having a normally flat bag-like main body equipped with a readily separable and reclosable plastic seam extending from end-to-end thereof, one end of said main body being heat-sealed closed in a fluid-tight manner by a permanent seam extending across the adjacent closed end of said plastic seam thereby preventing full opening of said seam, and the opposite lower open end of said protector having at least one permanently closed seam extending across the flattened rim edges of said open end at an angle to the longitudinal center line of said protector to restrict the girth of said open end to a value substantially less than the girth of said splice rack base ring whereby said protector can be assembled about said splice rack while said seam is open by wrapping the open sides thereof about said rack from the opposite sides thereof and then closing said seam to lock said protector in place.

References Cited by the Examiner

UNITED STATES PATENTS

| 2,913,030 | 11/1959 | Fisher | 150—52 |
| 2,927,955 | 3/1960 | Crawford | 174—138 |
| 3,209,061 | 9/1965 | Mier et al. | 174—138 |

FOREIGN PATENTS

| 426,542 | 4/1935 | Great Britain. |

LARAMIE E. ASKIN, *Primary Examiner.*